United States Patent
Cobb

[11] 3,841,094
[45] Oct. 15, 1974

[54] FLEXIBLE BAND BEARING FOR TORQUE CONVERTER ELEMENT

[75] Inventor: Raymond P. Cobb, Washington, Ill.

[73] Assignee: Caterpiller Tractor Co., Peoria, Ill.

[22] Filed: June 20, 1973

[21] Appl. No.: 371,572

[52] U.S. Cl.............. 60/339, 60/363, 60/364, 60/367, 308/238
[51] Int. Cl............................................. F16h 33/00
[58] Field of Search ............ 60/339, 345, 363, 364, 60/367; 415/172, 173, 174

[56] References Cited
UNITED STATES PATENTS
3,710,570   1/1973   Audiffred et al. ................ 60/339

*Primary Examiner*—Edgar W. Geoghegan
*Attorney, Agent, or Firm*—Phillips, Moore, Weissenberger Lempio & Strabala

[57] ABSTRACT

A torque converter has a dual impeller comprising primary and secondary pump members to rotate relative to each other under the control of a slipping clutch. An endless band, composed of a plastic bearing material, is stretched over and firmly contracted into the inner element to provide a dynamic bearing between the two elements.

3 Claims, 3 Drawing Figures

FLEXIBLE BAND BEARING FOR TORQUE CONVERTER ELEMENT

BACKGROUND OF THE INVENTION

U.S. Pat. No. 3,710,570, assigned to the assignee of this application, discloses an oil film bearing disposed between primary and secondary pump members, mounted together for relative rotation in a torque converter. Such bearing, although suitable for many torque converter applications, does not always provide the required anti-friction desiderata to prevent scuffing and wear between the pump members during torque converter operation.

SUMMARY OF THIS INVENTION

An object of this invention is to provide an improved bearing assembly which is economical to manufacture and service and exhibits high degrees of structural integrity and life expectancy. The bearing assembly comprises inner and outer members mounted together for relative rotation. An annular outer seating surface is formed on the inner member whereas an annular inner bearing surface is formed on the outer member.

An endless band, composed of a plastic bearing material, is stretched over and firmly contracted onto the annular seating surface of the inner member to have outer surface portions thereof disposed in close bearing relationship with respect to the inner bearing surface of the outer member. The bearing assembly finds particular application between inner and outer pump members of a dual impeller of a torque converter.

BRIEF DESCRIPTION OF THE DRAWINGS

Further objects of this invention will become apparent from the following description and accompanying drawings wherein.

DETAILED DESCRIPTION

Figure 1:
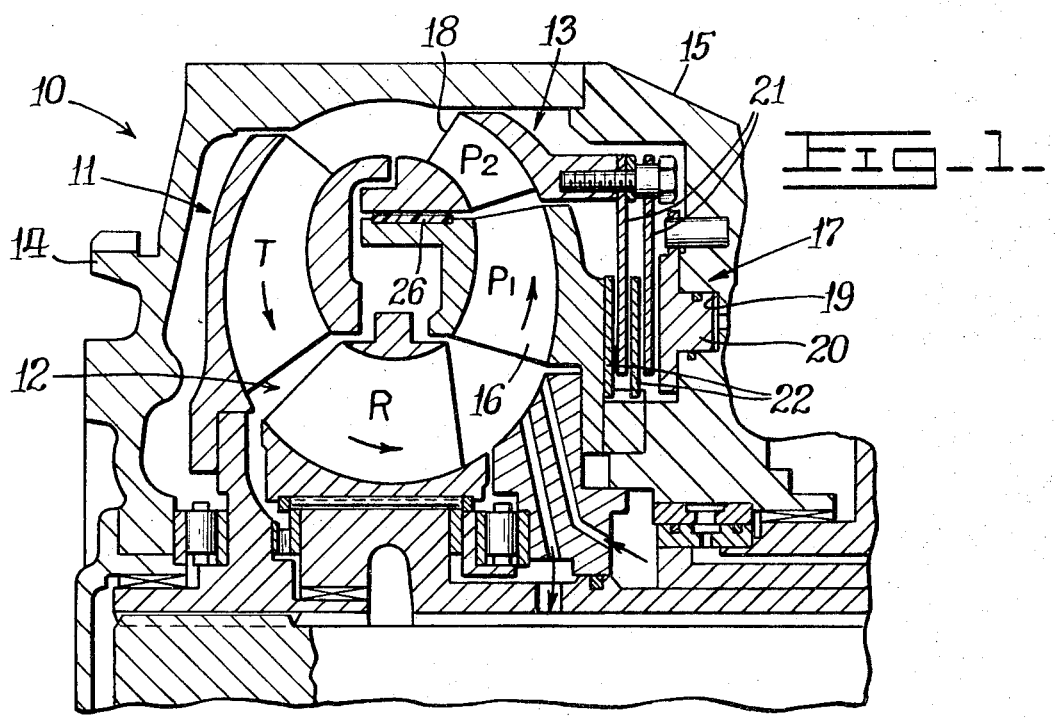
FIG. 1 is a cross sectional view of the upper half of a torque converter employing a dual impeller therein.

FIG. 1 discloses a torque converter 10 similar to those disclosed in above-mentioned U.S. Pat. No. 3,710,570. The torque converter essentially comprises a turbine means 11, a reactor or stator means 12 and a dual impeller means 13, all suitably constructed and arranged in a conventional manner to multiply torque in a power drive train. In particular, a power input means, such as an engine flywheel (not shown) connected to a ring gear 14, is adapted to rotate a multipart housing 15.

The housing, in turn, rotates a primary or inner pump member 16 of the impeller means which is fixedly mounted thereon. Upon selective engagement of a slipping clutch 17, the primary pump member and a secondary or outer pump member 18 of the impeller means are adapted to be coupled together for simultaneous rotation. During such coupling, pressurized fluid will enter an actuating chamber 19 behind an annular piston 20 to compress a plurality of annular friction discs 21 and 22 together.

Figure 2:
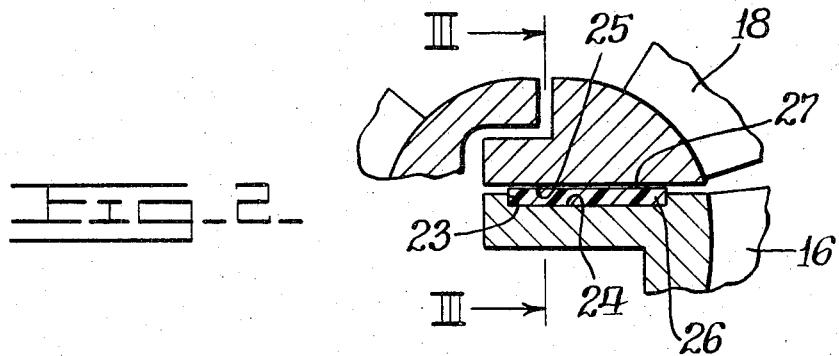
FIG. 2 is an enlarged view taken in FIG. 1 disclosing a bearing assembly of this invention mounted between primary and secondary pump members comprising the dual impeller.
Figure 3:
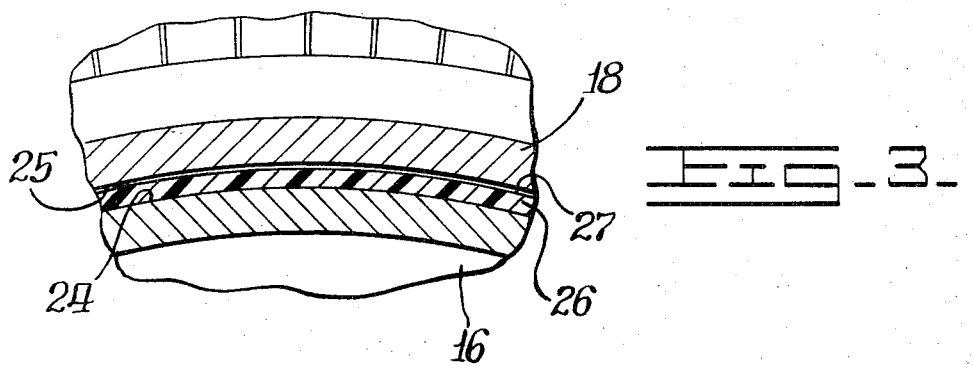
FIG. 3 is a sectional view taken in the direction of arrows III—III in FIG. 2.

As more clearly shown in FIGS. 2 and 3, inner pump member 16 has an annular groove 23 formed therearound to provide an annular outer seating surface 24 defined by an outer first diameter. The outer pump member has an annular inner bearing surface 25 formed thereon to define an annular gap between the two members. A stretchable endless band 26, constituting a suitably composed plastic bearing material such as Nylon or Teflon (polytetrafluoroethylene), is seated in groove 23.

An annular outer surface 27 of the band is thus placed in close bearing relationship with respect to opposed bearing surface 25 of the secondary pump member. The band normally has an inner second diameter which is slightly smaller than the first diameter defining seating surface 24, when the band is in its relaxed condition. During assembly of the torque converter, the endless band is stretched over the seating surface and released to permit it to contract automatically into snug seating relationship thereon.

What is claimed is:

1. A bearing assembly comprising
   inner and outer members mounted together for relative rotation,
   an annular outer seating surface, defined by a first diameter, formed on said inner member,
   an annular inner bearing surface formed on said outer member to define an annular gap between said seating and bearing surfaces, and
   a stretchable endless band, composed of a plastic bearing material and normally having an inner second diameter slightly smaller than said first diameter when said endless band is in its relaxed condition, stretched over and firmly contracted onto the annular seating surface of said inner member to have outer surface portions thereof disposed in close bearing relationship with respect to the inner bearing surface of said outer member,
   said inner and outer members being rotatably mounted in a torque converter.

2. The bearing assembly of claim 1 wherein said inner and outer members respectively constitute primary and secondary pump members of impeller means of said torque converter.

3. The bearing assembly of claim 2 further comprising slipping clutch means operatively connectable between said primary and secondary pump members for infinitely varying relative rotation therebetween.

* * * * *